(12) United States Patent
Kreh et al.

(10) Patent No.: US 10,493,971 B2
(45) Date of Patent: Dec. 3, 2019

(54) ELECTRIC MOTOR-PUMP ASSEMBLY

(71) Applicant: Continental Teves AG & Co. oHG, Frankfurt (DE)

(72) Inventors: Heinrich Kreh, Florstadt (DE); Michael Jürging, Kelkheim (DE); Marcel Niepenberg, Meinhard-Hitzelrode (DE); Jose Gonzalez, Bad Oeynhausen (DE); Hans-Michael Koppel, Frankfurt (DE); Manfred Rüffer, Sulzbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 135 days.

(21) Appl. No.: 15/504,173

(22) PCT Filed: Aug. 17, 2015

(86) PCT No.: PCT/EP2015/068841
§ 371 (c)(1),
(2) Date: Feb. 15, 2017

(87) PCT Pub. No.: WO2016/026809
PCT Pub. Date: Feb. 25, 2016

(65) Prior Publication Data
US 2017/0274886 A1 Sep. 28, 2017

(30) Foreign Application Priority Data
Aug. 22, 2014 (DE) .................. 10 2014 216 721

(51) Int. Cl.
*B60T 17/02* (2006.01)
*F16D 1/06* (2006.01)
(Continued)

(52) U.S. Cl.
CPC ............ *B60T 17/02* (2013.01); *F04B 43/026* (2013.01); *F04B 43/04* (2013.01); *F16C 3/18* (2013.01);
(Continued)

(58) Field of Classification Search
CPC ........... F04B 43/026; F04B 43/04; F16C 3/18
(Continued)

(56) References Cited

U.S. PATENT DOCUMENTS 3,367,277 A   2/1968 Andrews et al.
3,974,714 A   8/1976 Fritsch
(Continued)

FOREIGN PATENT DOCUMENTS

DE   1528408 A1   7/1969
DE   2446806 A1   4/1976
(Continued)

OTHER PUBLICATIONS

International Search Report and Written Opinion for International Application No. PCT/EP2015/068841, dated Apr. 19, 2016, 13 pages.
(Continued)

*Primary Examiner* — Michael Leslie
*Assistant Examiner* — Daniel S Collins
(74) *Attorney, Agent, or Firm* — RatnerPrestia

(57) ABSTRACT

In an electric motor-pump assembly, two working diaphragms, each delimiting a working chamber, are cyclically driven by a crank drive via connecting rods. The crank drive includes eccentrics for each connecting rod, which are placed on an axial bearing journal in the extension of an output shaft of an electric motor. In order to ensure a rotationally fixed connection between the eccentrics and the bearing journal to be produced and in order to ensure an angularly precise position of the two eccentrics, each of the
(Continued)

eccentrics is connected to the bearing journal by a positively locking engagement.

4 Claims, 4 Drawing Sheets

(51) Int. Cl.
  *F16D 1/10*  (2006.01)
  *F16C 3/18*  (2006.01)
  *F04B 43/02*  (2006.01)
  *F04B 43/04*  (2006.01)
  *F16C 3/20*  (2006.01)

(52) U.S. Cl.
  CPC ............... *F16D 1/06* (2013.01); *F16D 1/101* (2013.01); *F16C 3/20* (2013.01)

(58) Field of Classification Search
  USPC ....................................................... 92/68, 71
  See application file for complete search history.

(56) References Cited

U.S. PATENT DOCUMENTS

| | | | |
|---|---|---|---|
| 8,702,180 B2 * | 4/2014 | Ruffer | B60T 17/02 303/10 |
| 8,714,941 B2 * | 5/2014 | Ruffer | B60T 17/02 417/255 |
| 8,926,293 B2 | 1/2015 | Ruffer et al. | |
| 9,234,515 B2 | 1/2016 | Ruffer et al. | |
| 2011/0271670 A1 | 11/2011 | Krebs et al. | |
| 2014/0119961 A1 | 5/2014 | Konig et al. | |

FOREIGN PATENT DOCUMENTS

| | | |
|---|---|---|
| DE | 2518150 A1 | 11/1976 |
| DE | 102008042877 A1 | 4/2010 |
| EP | 2390492 A2 | 11/2011 |
| JP | 2010180806 A | 8/2010 |
| KR | 20110103430 A | 9/2011 |
| KR | 20120117827 A | 10/2012 |
| KR | 20130131393 A | 12/2013 |
| WO | 2010069963 A1 | 6/2010 |

OTHER PUBLICATIONS

German Search Report for German Application No. 10 2014 216 721.3, dated Jun. 11, 2015, including partial English translation, 8 pages.

Korean Decision for Grant of Patent for Korean Application No. 10-2017-7004884, dated Dec. 1, 2018, with translation, 4 pages.

* cited by examiner

ELECTRIC MOTOR-PUMP ASSEMBLY

CROSS REFERENCE TO RELATED APPLICATIONS

This application is the U.S. National Phase Application of PCT International Application No. PCT/EP2015/068841, filed Aug. 17, 2015, which claims priority to German Patent Application No. 10 2014 216 721.3, filed Aug. 22, 2014, the contents of such applications being incorporated by reference herein.

FIELD OF THE INVENTION

The invention relates to an electric motor-pump assembly, particularly for providing pressure for a brake actuation device of a motor vehicle brake system, having a pneumatic brake booster, in particular a vacuum brake booster, comprising a vacuum pump and an electric motor driving the vacuum pump, wherein the vacuum pump comprises at least two working chambers, each defined by a working element, wherein each working element is connected to a connecting rod, which is supported by a crank drive, which comprises a bearing journal, which is driven by the electric motor and onto which an eccentric for each connecting rod is rotationally locked, for which purpose said eccentric has an opening, through which the bearing journal projects.

BACKGROUND OF THE INVENTION

An electric motor-pump assembly is described in WO 2010/069963 A1, which is incorporated by reference. The crankshaft is configured as follows: The output shaft of the electric motor is of reduced cross section at its end projecting from the electric motor housing and thereby forms a bearing journal there, on which two or more eccentrics are arranged, rotationally locked.

The eye of a connecting rod is rotatably supported on each of the eccentrics. The connecting rod is in turn connected to the working element of the vacuum pump, which may be a piston or a working diaphragm. Each eccentric is moreover integrally provided with a balance weight. The rotationally locked connection of the eccentrics to the bearing journal is produced through a frictional grip. For this purpose the bearing journal is inserted through the openings in the eccentric. Since these openings have a somewhat smaller cross section than the bearing journal, a press-fit is created, which consists of a strong frictional grip between the circumferential face of the opening and the bearing journal.

In addition, three-dimensional position codings are provided on the eccentrics, which ensure that the two eccentrics and their balance weights are oriented in a predefined angular position relative to one another, so as to achieve the quietest possible running of the vacuum pump. For position coding, pins are situated on the one side of each eccentric and holes, which are intended to receive the pins, on the other side.

This makes the manufacture and assembly of the eccentrics an expensive process.

SUMMARY OF THE INVENTION

An aspect of the invention, therefore, is to arrive at a simpler construction.

To achieve this, an aspect of the invention proposes that the rotationally locked connection is in each case produced by a positive interlock, for which purpose the bearing journal and the opening have a cross section deviating from a circular shape.

Such a positive interlock at the same time contains a position coding, so that fitting the eccentrics onto the bearing journal firstly achieves a rotationally locked connection due to the positive interlock, and secondly achieves the desired angular position.

The positive interlock is extremely easy to produce in that the bearing journal has at least one lateral flat and that the circumferential surface of each opening through which the bearing journal passes has a boundary surface, which is set against the flat to form a positive interlock.

In order to reliably prevent the eccentrics turning on the bearing journal even in operational running, it is proposed that the bearing journal have at least two opposing flats, the distance between which corresponds to the distance between two opposing boundary surfaces of the openings.

Instead of individual flats, the bearing journal may also be provided with a plurality of longitudinal channels, which form a knurled surface. The openings in the eccentrics are provided with a corresponding, mating knurled surface, which forms a positive interlock with the knurled surface of the bearing journal.

In order to facilitate the process of fitting the eccentrics onto the knurled bearing journal, it is proposed that the free end of the bearing journal have a head tapering conically towards the free end of the bearing journal.

Another possible way of producing good rotational locking is afforded in that the output shaft of the electric motor has an open blind hole in the end face, that the eccentrics each have a hole with the same cross section as the blind hole and that a clamping sleeve runs through the hole and the blind hole.

The clamping sleeve is radially pre-stressed, so that it tends to expand, producing a frictional grip between the clamping sleeve and the circumferential surface of the holes which is durable, since the pre-stressing of the clamping sleeve is also retained over time.

In one aspect the clamping sleeve may comprise a spring steel hollow cylinder, which is provided with a longitudinal slot. The longitudinal slot allows the clamping sleeve to be compressed to the diameter of the blind hole and the holes. The elastic characteristics of the spring steel ensure that the clamping sleeve has a tendency to expand, thereby achieving a constant pre-stressing of the clamping sleeve against the circumferential surfaces of the holes.

BRIEF DESCRIPTION OF THE DRAWINGS

The invention will be explained in more detail below with reference to an exemplary embodiment. In the drawing.

DETAILED DESCRIPTION OF THE PREFERRED EMBODIMENTS

Figure 1:
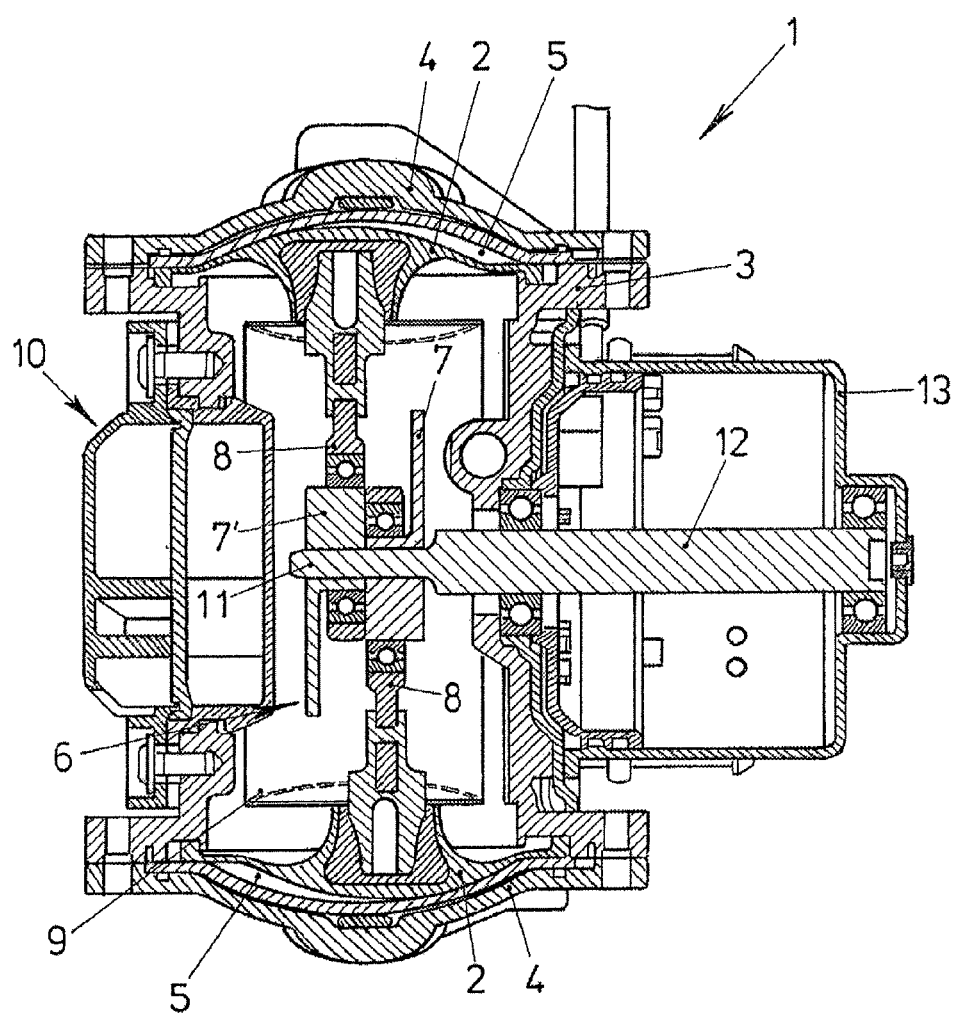
FIG. 1 shows an embodiment according to the state of the art.

Referring first of all to FIG. 1:

The vacuum pump 1 is a double-diaphragm pump having two opposing working diaphragms 2, which are each clamped between a pump housing 3 and a working chamber cover 4 and thereby define a working chamber 5. The working diaphragms 2 can be moved in opposite directions by means of a crank drive 6, wherein the crank drive 6 has an eccentric 7 for each working diaphragm 2, on which the eye of a connecting rod 8, connected to the respective working diaphragm 2, is supported. The reciprocating movement of the working diaphragms 2, which in this exemplary embodiment form the working elements of the vacuum pump 1, causes air to be drawn into the working chamber from the unit to be exhausted, before it is expelled into the atmosphere.

A discharge valve—not shown here—via which the air expelled from the working chamber is fed, in each case via a discharge port in the working chamber cover, to a discharge port in the pump housing 3, is provided in each of the working chamber covers 4. The two discharge ports in the pump housing open into an internal chamber 9 of the pump housing 3, the so-called crank chamber, which encloses the crank drive 6. An air outlet 10 provided in the pump housing allows the air to be quietly discharged from the internal chamber 9.

Eccentrics 7, 7' are press-fitted onto a bearing journal 11 of circular cross section, which extends the output shaft 12 of an electric motor 13, externally fitted to the pump housing 3, in an axial direction, and the axis of which lies in the axis of the output shaft 12.

Figure 2:
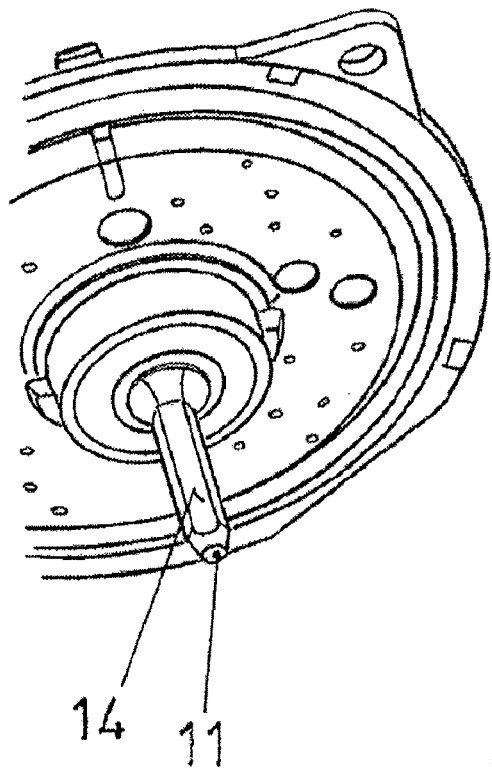
FIG. 2 shows a side view of a bearing journal as output shaft of an electric motor.
Figure 3:
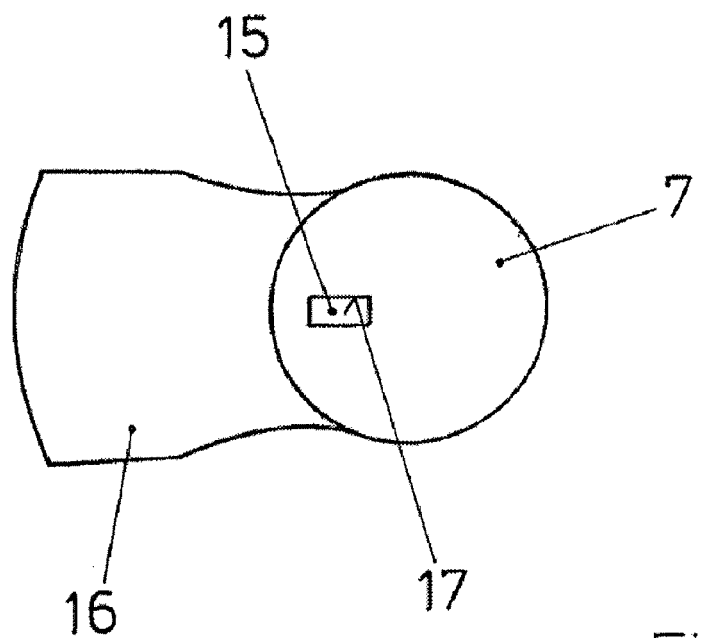
FIG. 3 shows a side view of an eccentric, matching the bearing journal according to FIG. 2.

By contrast, an aspect of the invention, as represented in FIGS. 2 and 3, provides for a bearing journal 11 having an angular cross section with multiple lateral flats 14, which each run parallel to the axis of the bearing journal 11, and at least two of which are situated opposite one another and run parallel.

Each eccentric 7 according to FIG. 3 comprises a disk, which has an off-center opening 15, which has a rectangular cross section. A balance weight 16, which extends in a radial direction, can also be seen, integrally formed with the disk.

The distance between the two long sides of the opening 7, which each form a boundary surface 17, is equal to the distance between the two aforementioned flats 14. The distance between the short sides of the opening 15 is equal to the diameter of the bearing journal 11, relative to a plane, parallel to the flats 14 and running through the axis of the bearing journal. In this way a positive interlock is obtained between the bearing journal and the eccentric 7.

The disks are of a certain thickness, so that the opening 15 has a certain depth, allowing the flats 14 to bear against the long boundary surfaces of the rectangular opening 15 over a sufficiently large contact area. This ensures that a sufficiently large torque can be transmitted.

In addition, this allows a second eccentric 7', which is of similar construction to the first eccentric 7 represented, to be fitted onto the bearing journal at precisely 180° to the first eccentric 7.

Figure 4:
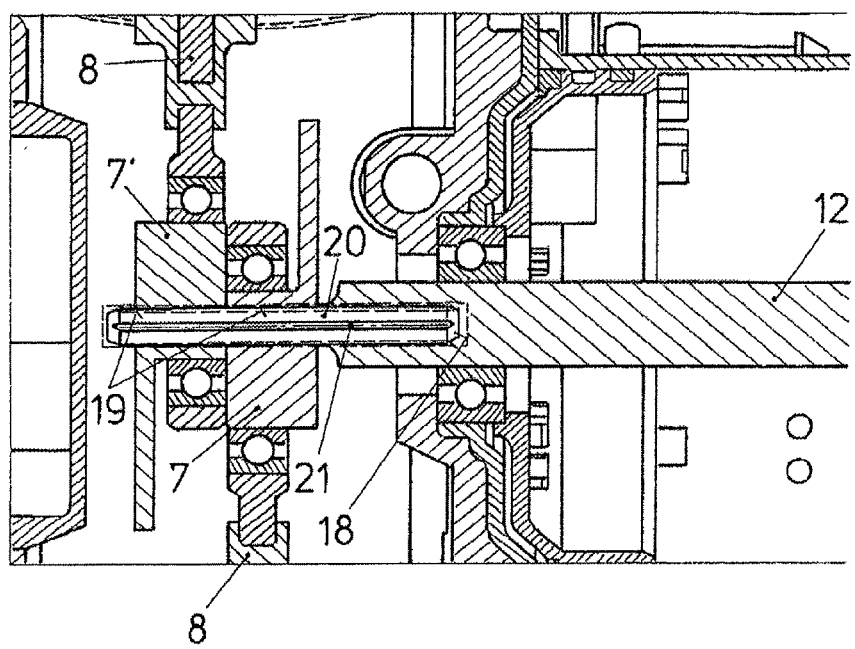
FIG. 4 shows a crank drive, which is connected to the output shaft by means of a clamping sleeve.
Figure 5:
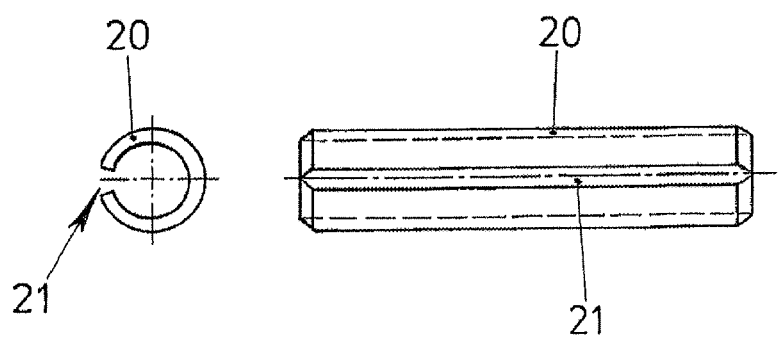
FIG. 5 shows a side view and a cross sectional view of the clamping sleeve and FIG. 6 shows a further embodiment of the bearing journal.

FIG. 4 shows the cross section through a further invention. An axial blind hole 18 is made in the end face of the output shaft 12. Holes 19 in the eccentrics 7 for receiving the bearing journal 11 are circular.

For a rotationally locked connection of the eccentrics 7 to the output shaft 12, a clamping sleeve 20 is provided. This is a hollow cylinder having a longitudinal slot 21 and made from a spring steel. The longitudinal slot 21 allows the clamping sleeve 20 to be radially compressed when it is fed through the holes. The resilient characteristics then cause the clamping sleeve 20 to expand and create a secure positive interlock in the openings of the eccentric disks and in the blind hole.

Figure 6:
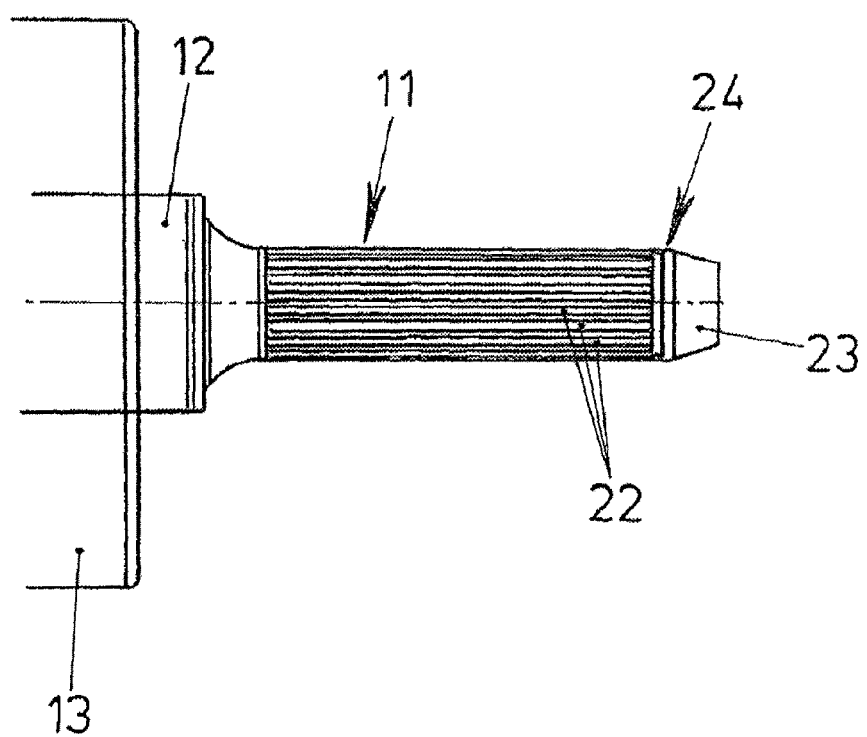

FIG. 6 shows a further embodiment of the bearing journal 11. The bearing journal 11 has a knurled surface, which comprises a plurality of longitudinal channels 22, which allows a positively interlocking connection to an eccentric, which has a corresponding, mating knurled surface.

At its free end the bearing journal has a conical head 23, which facilitates the fitting of the eccentrics. A groove 24, running around the bearing journal runs between the knurled surface and the head.

REFERENCE NUMERALS 1 vacuum pump
2 working diaphragms
3 pump housing
4 working chamber cover
5 working chamber
6 crank drive
7 eccentric
8 connecting rod
9 internal chamber
10 air outlet
11 bearing journal
12 output shaft
13 electric motor
14 flats
15 opening
16 balance weight
17 boundary surface
18 blind hole
19 hole
20 clamping sleeve
21 longitudinal slot
22 longitudinal channels
23 head
24 groove

The invention claimed is:

1. An electric motor-pump assembly, for providing pressure for a brake actuation device of a motor vehicle brake system, having a pneumatic brake booster, comprising:
   a vacuum pump; and
   an electric motor driving the vacuum pump,
   wherein the vacuum pump comprises at least two working chambers, each defined by a working element,
   wherein each working element is connected to a connecting rod, which is supported by a crank drive, which comprises a bearing journal, which is driven by the electric motor and onto which a first eccentric for one connecting rod and a second eccentric for another connecting rod are rotationally locked, for which purpose each eccentric has an opening, through which the bearing journal projects,
   wherein the first eccentric bears against the second eccentric, and
   wherein the rotationally locked connection between the bearing journal and the first and second eccentrics is produced by a positive interlock, for which purpose the bearing journal and the opening of each eccentric each have a cross section deviating from a circular shape, the cross section of the bearing journal having a different shape than the cross section of the opening of each eccentric, such that the first eccentric is fitted onto the bearing journal at precisely 180° relative to the second eccentric.

2. The electric motor-pump assembly as claimed in claim 1, wherein the bearing journal has at least two opposing flats, and
   wherein a circumferential surface of each opening through which the bearing journal passes has two parallel boundary surfaces, wherein a distance between the two opposing flats of the bearing journal corresponds to a distance between the two parallel boundary surfaces of the opening, so that each of the two parallel boundary surfaces is set against a respective one of the two opposing flats to form a positive interlock.

3. The electric motor-pump assembly as claimed in claim 1, wherein the bearing journal is provided with a plurality of longitudinal channels.

4. The electric motor-pump assembly as claimed in claim 3, wherein a free end of the bearing journal comprises a head tapering conically towards the free end of the bearing journal.

\* \* \* \* \*